Jan. 9, 1940.　　　　J. O. VAN LEER　　　　2,186,157
METHOD AND DEVICE FOR THE MANUFACTURING OF SOUND FILMS
Filed Jan. 18, 1936
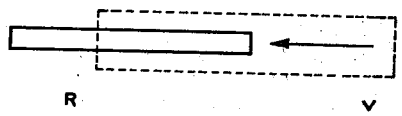
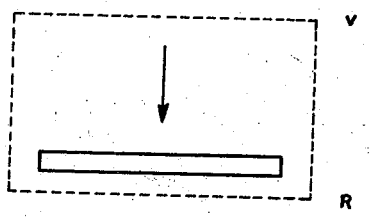
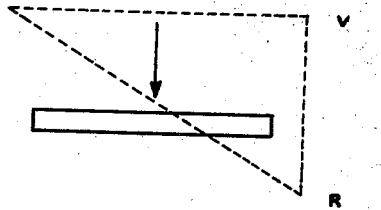
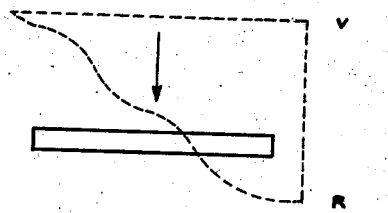
Inventor
　Jacques O. van Leer
By E. F. Wenderoth
　　Atty.

Patented Jan. 9, 1940

2,186,157

UNITED STATES PATENT OFFICE 2,186,157

METHOD AND DEVICE FOR THE MANUFACTURING OF SOUND FILMS

Jacques Oscar van Leer, Wassenaar, Netherlands

Application January 18, 1936, Serial No. 59,764
In the Netherlands August 23, 1935

16 Claims. (Cl. 179—100.3)

The invention relates to the manufacturing of sound films. In general two principles have been proposed already.

According to the first principle the intensity of the light falling upon the film through a slit is modulated in accordance with the produced sound. This intensity-modulation can be effected by a variable source of light or by means of a constant source of light in combination with a variable light-sluice for example either of the mechanical type or of the electro-optical type, such as the Kerr-cell.

According to the other principle a pencil of light is thrown upon the slit and moved by an oscillograph into the direction of the slit so that in proportion to the said displacement, a smaller or larger portion of the slit is illuminated so that a blackening band is produced on the film moving perpendicularly to the direction of the slit, the enveloping line of said blackening band being graphics of the produced sound-variations.

The invention makes use of a new principle producing a blackening variation. This principle can be combined in a very simple manner with the second principle referred to above, viz. that of the transversal modulation so that in this manner a combination of the effects can be obtained.

According to the basic principle of the invention, a spectrum or a portion of a spectrum is moved over the slit in accordance with the variations of the produced sound, whereby the produced blackening is determined by the spectral colour falling on it, because photographic emulsions have a sensibility being a function of the wave-length of the light falling upon it.

According to another feature the said spectrum is moved over the slit in such a manner, that the illuminated portion of the slit varies in a well-known manner with the sound, whereas moreover the wave-length of the light falling upon it, likewise varies with the sound so that the blackening is partly determined by the quantity of the light falling upon it and partly by the colour of the said light, the latter depending on the colour-sensibility characteristic of the material.

The division of the light into the spectral colours may be done in any well-known manner, for example with the aid of a prism and an objective which forms the spectrum as a series of coloured images of an illuminated slit.

The lateral movement of the said pencil of light, may likewise be effected in various manners, for example with the aid of an oscillograph carrying a mirror which rotates in accordance with the sound-variations.

Finally the spectrum may be moved over the slit, in different manners.

In Figure 1 the slit is illustrated as a rectangle drawn in full lines and the spectrum as a rectangle drawn in full lines and the spectrum as a rectangle in dotted lines. If the said spectrum is moved in the direction of the arrow, the illuminated portion of the slit, as well as the blackening, increase, whereby it has been taken that the film becomes more sensible to light of shorter wave length.

Figure 2 illustrates how the entire slit is illuminated whereby the blackening increases if the spectrum is displaced in the direction of the arrow, due to a greater sensibility to light of a smaller wave-length.

Figure 3 shows how by a spectrum which is slantingly cut off by a diaphragm and moved in the direction of the arrow, an increasing portion of the slit is illuminated, whereas the blackening increases at the same time, when the film is more sensible to rays of shorter wave-length.

Thus here a combined and consequently a stronger effect is obtained.

Figure 4 shows how with a non-linear sensibility curve and a linear displacement a linear effect can yet be obtained by bounding non-linearly the spectrum in such a manner, that the non-linearity of the sensibility is compensated.

By means of a distorting optical means, for example a curved mirror, the spectrum can be distorted before being thrown upon the film by which definite colours are placed more close together and other colours further apart.

It is clear that the said difference in blackening is determined by the composition of the light falling upon the film, as well as by the selective sensibility of the film or the emulsion. Now the invention has also for its effect to increase considerably the sensibility of the method, so that very small displacements of the spectrum with respect to the slit, which are obtained for example by very small oscillations of an oscillograph-mirror, already suffice for obtaining considerable differences in blackening. In order to obtain this, various means are applied which by preference are used in combination.

In the first place a source of light may be used, such as a mercury lamp, radiating strongly definite sorts of light, but as far as the frequency is concerned, immediately bounding it, either very feebly or not at all, so that in the said field of transition the emitted light-intensity is a steep function of the frequency which by preference should be less or more linear.

With filters which in the visible field will be coloured, which, however, can also be used for ultra-violet light, the characteristic representing the intensity of the light as a function of the frequency, may be amended and corrected considerably. Attention should be paid to the fact, however, that such a filter decreases the total intensity of the light. Filters letting completely pass a definite sort of light, absorbing, however, that which in frequency follow the first mentioned sort, are for example the so-called "Wratten" filters.

Finally the film itself can be sensibilised with the aid of sensibilisators being known in themselves, in such a manner, that by a definite colour it is strongly blackened; by a colour of a successive frequency, however, little or not at all. The said sensibilisation may be completed by filter-colouring matter in the emulsion layer.

By combining all the said means in the right manner, an enormous frequency-sensibility can be obtained so that very small displacements of the spectrum with respect to the slit give a great difference of blackness on the film, whereas it will always be possible to make the relation between transmission of the positive and the intensity of the sound to be recorded by means of these independently variable means, absolutely linear.

I claim:

1. A method of optical sound registration whereby the blackening is determined by the light falling upon it, comprising throwing a spectrum on a film through a slit while said spectrum is moved in accordance with the sound being recorded whereby the wave-length of said light varies in accordance with the sound being recorded whereas the film has a sensibility which is a function of said wave length.

2. A method of optical sound registration whereby the blackening is determined by the light falling upon it, comprising throwing a portion of a spectrum on a film through a slit while said portion of a spectrum is moved in accordance with the sound being recorded whereby the wave-length of said light varies in accordance with the sound being recorded whereas the film has a sensibility which is a function of said wave length.

3. A method according to claim 1, in which the spectrum is moved into the direction of the slit whereas at the same time the colour is varying in the said direction in such a manner that in case of increase of the illuminated portion of the slit, the activity of the light increases too.

4. A method according to claim 1, in which the colours follow each other and at the same time the spectrum is moved in a direction perpendicular to that of the slit.

5. A method according to claim 2, in which the spectral lines become longer for more active colours, so that a combination of a transverse effect and an intensity-effect is obtained.

6. A method according to claim 2, in which the boundation of the spectrum is such that it compensates every non-linearity e. g. that of the sensibility-curve.

7. A method according to claim 2, in which by an interchangeable diaphragm the limitation-curve of the spectrum is adapted to the colour-sensibility-characteristic of the film-material or other non-linear effect.

8. A method according to claim 2, in which the spectrum is distorted by a special means, for example a curved mirror, so that definite colours are placed more close together and other colours further apart.

9. A process for recording sound on a photographic film, whereby the blackening of the recording material of the film is determined by the rays to which the recording material of the film is exposed, characterized in that a discontinuous spectrum of electromagnetic rays, i. e. spectrum of such rays, not being limited to the visible or any special region, which shows to a greater or lesser degree differences of intensity between the various parts of the spectrum, is projected on a slit, behind which the light sensitive film is moving and that the spectrum is moved in accordance with sound frequencies so, that a region of this spectrum is sliding over the slit within which region of discontinuity the intensity of the various wave lengths therein comprised, varies with the wave length.

10. A process according to claim 9 in which a curve with the abscissa showing the logarithms of the modulation and the ordinate the blackening resulting therefrom, traced in a system of coordinates with a logarithmic unity on the abscissa and a linear unity on the ordinate, has for the greatest possible part a straight linear shape.

11. A process according to claim 9 in which as a discontinuous spectrum an emission lines or an emission bands spectrum is used.

12. A process according to claim 9 in which as a discontinuous spectrum an absorption spectrum is used, which is produced by means of a filter with a more or less sharply limited absorption band.

13. A process according to claim 9 in which as a discontinuous spectrum a spectrum is used of which a part has been screened off.

14. A process according to claim 9 in which as a discontinuous spectrum a spectrum is used in which the intensity of the respective parts of the spectrum is varied, because of a part being distorted by means of distorting optical means.

15. A process according to claim 9 in which a region of discontinuity of the spectrum, respectively the region of wave lengths, where for the film itself and/or by means of the use of special sensibilizers shows a difference in sensitivity for the different wave lengths of the spectrum, will be chosen in such a manner, that these regions coincide as much as possible.

16. A process according to claim 9 in which a region of a discontinuous spectrum with the steepest slope of the intensity of the different wave lengths, therein comprised, respectively the region of wave lengths where for the film itself and/or by means of the use of special sensibilizers, shows the steepest slope of the color sensitivity curve will be chosen in such a manner that these two regions coincide as much as possible.

JACQUES OSCAR VAN LEER.